United States Patent [19]

Worman, Jr.

[11] 4,117,220

[45] Sep. 26, 1978

[54] REMOVAL OF VINYL CHLORIDE FROM PVC RESINS USING MICROWAVE RADIATION

[75] Inventor: Charles H. Worman, Jr., Whitehall, Pa.

[73] Assignee: Air Products and Chemicals, Inc., Allentown, Pa.

[21] Appl. No.: 714,024

[22] Filed: Aug. 13, 1976

[51] Int. Cl.$^2$ ............................................. C08F 6/00
[52] U.S. Cl. ..................................... 528/503; 526/344
[58] Field of Search .................. 528/503; 204/159.22; 526/344, 345

[56] References Cited

U.S. PATENT DOCUMENTS

| | | | |
|---|---|---|---|
| 3,432,413 | 3/1969 | Vanderhoff | 204/159.22 |
| 4,008,361 | 2/1977 | Park | 528/503 |
| 4,015,065 | 3/1977 | Park | 528/503 |

FOREIGN PATENT DOCUMENTS 1,226,988  3/1971  United Kingdom ..................... 528/503

Primary Examiner—Christopher A. Henderson, Jr.
Attorney, Agent, or Firm—Richard A. Dannells, Jr.; Barry Moyerman

[57] ABSTRACT

Residual vinyl chloride monomer is removed from polyvinyl chloride by subjecting the polymer to microwave radiation in the presence of water.

2 Claims, No Drawings

REMOVAL OF VINYL CHLORIDE FROM PVC RESINS USING MICROWAVE RADIATION

BACKGROUND OF THE INVENTION

1. Field of the Invention

This invention relates generally to an improved method for removal from polyvinyl chloride resins of trapped vinyl chloride monomer that has not been polymerized.

2. Prior Art

In the production of vinyl chloride homopolymers and copolymers, there is absorbed or otherwise retained in the obtained resin, a certain amount of unpolymerized monomer which may vary with the method or conditions employed in the polymerization. Not only is the residual monomer an undesirable contaminant from the standpoint of impairing the quality of the resin, but also there is current belief that such residual vinyl chloride monomer may present a health hazard to persons utilizing the contaminated resin in industry.

Various methods have been heretofore suggested for removal of the residual vinyl chloride monomer and accompanying comonomers from vinyl chloride polymerizates. These prior methods have not been regarded as wholly satisfactory in practical application.

Among the known previous methods attempted or employed is that of steam stripping, an improvement on which is asserted in German patent publication OLS No. 2,331,895. In accordance with the disclosure in this German publication, polyvinyl chloride resin is heated at a temperature between its glass transition temperature (about 67°-68° C) and 180° C, by direct condensation of water vapor thereon, for sufficient time to remove the major portion of the contained monomer, then the condensed water and accompanying monomer are volatilized from the resin by pressure reduction. In the example applied to a polyvinyl chloride homopolymer obtained by gas phase polymerization and which contained 3.4% residual vinyl chloride monomer, about 91% removal of monomer is stated to have been effected.

SUMMARY OF THE INVENTION

In accordance with the present invention, rapid removal of residual vinyl chloride monomer from polyvinyl chloride resin is achieved without deleterious decomposition or other impairment of resin properties, by subjecting the polymer in the presence of water to microwave irradiation. The method is applicable not only to PVC homopolymers, but also to copolymers thereof containing a major proportion of polymerized vinyl chloride. Removal of over 99% of contained vinyl chloride monomer is obtained in treating periods of generally 6–8 minutes. In many instances, the monomer content is reduced to non-detectable quantities.

DESCRIPTION OF PREFERRED EMBODIMENTS

In the examples below, microwave radiation was applied to a PVC slurry obtained by suspension polymerization. Prior to subjecting the same to irradiation, the slurry was analyzed for residual monomer content and solids content. In this first series of runs (Example 1), a microwave oven was employed having a rated frequency of about 2450 megacycles/second (Litton Industries, Model 500 017). Certain of the experiments were repeated (Example 2) using another type microwave oven of similar rating (Westinghouse Model 5201XX1-1600 watt); no significant differences were noted.

EXAMPLE 1

The resin in the slurry employed had a porosity corresponding to 28.8 as determined by the IPTU method (Irreversible Plasticizer Take-up) before treatment, which was increased to 32.4 after treatment.

About 50 grams of the PVC slurry was placed in a glass dish and subjected to microwave radiation at about 2450 megacycles/second. Samples were removed at various time intervals and analyzed for residual vinyl chloride monomer content and percent solids. The results obtained in repeated runs on two samples of the same slurry are reported below.

TABLE 1

| Time (min) | SAMPLE 1 Residual VCM (ppm) | % solids | SAMPLE 2 Residual VCM (ppm) | % solids |
|---|---|---|---|---|
| 0 | 6057 | 55.9 | 5489 | 55.9 |
| 2 | 499 | ~66 | 286 | 65.9 |
| 4 | 90 | 73 | 68 | 72.6 |
| 6 |  |  | 29 | 85.2 |
| 8 | 29 | 92.4 | ~30 | 99.7 |

In the first sample there was some tendency to decomposition noted after about 8 minutes exposure. On repetition of the run (Sample 2) no decomposition occurred although the slurry was brought almost to dryness.

EXAMPLE 2

A fresh sample of the polyvinyl chloride slurry used in Example 1 was similarly treated in another model microwave oven of the same frequency rating. Sixty grams of the slurry were subjected to irradiation and the runs repeated using 79 grams of fresh slurry. The results are given in Table 2, below:

TABLE 2

| Time (min) | SAMPLE 3 Residual VCM (ppm) | % solids | SAMPLE 4 Residual VCM (ppm) | % solids |
|---|---|---|---|---|
| 0 | 24844 | 49 | 27969 | 55 |
| 2 | 689 | 69 | 910 | 70 |
| 4 | 215 | 82 | 1059 | 79 |
| 6 | 129 | 95 | 421 | 90 |
| 8 | 131 | 99 | 130 | 93 |
| 15 | 44 | 99 | 63 | 99 |

To avoid decomposition of the resin during microwave irradiation, it is important that water be present. The criticality of the presence of water to obtain desired removal of VCM without decomposition of the resin is illustrated in Example 3 below. While the lower limit of water content may vary with the type of resin and irradiation conditions, in general it can be stated that the water content should be maintained at 10% at least by weight of resin and preferably at no less than 20%.

EXAMPLE 3

About 50 grams of a PVC slurry was air dried to 99% solids and then subjected to microwave radiation. The results of repeated runs are shown in Table 3 below:

TABLE 3

| Time (min) | SAMPLE 5 Residual VCM (ppm) | % solids | SAMPLE 6 Residual VCM (ppm) | % solids |
|---|---|---|---|---|
| 0 | 7755 | 99 | 7755 | 99 |
| 2 | 7805 | 99 | 6160 | 99 |
| 4 | 7118 | 99 | 6686 | 99 |
| 6 | 7077 | 99 | 5431 | 99 |
| 8 | *4679 | 99 | *3571 | 99 |
| 12 | 1098 | 99 | 431 | 99 |

*decomposition noted

It will be seen that in the above runs on dry resin, that no notable decrease in VCM content was observed until decomposition of the resin occurred, under the conditions employed.

Addition of water during microwave irradiation of a PVC resin slurry effects more rapid removal of residual vinyl chloride monomer, obtaining products having no detectable content of monomer.

EXAMPLE 4

Fifty grams of a resin slurry of the same type as that employed in the previously described runs was subjected to microwave irradiation as before. After 1 minute exposure excess, fresh water (100 gm) was added and the material returned to the oven for further treatment. In a repeated run, 100 grams of slurry were employed to which 100 grams of water were added. The results are reported in Table 4, below:

TABLE 4

| Time (min) | Residual VCM (ppm) | % solids | Residual VCM (ppm) | % solids |
|---|---|---|---|---|
| 0 | 29,646 | 51 | 21,505 | 49 |
| 2 | 18,695 |  | 2,940 | 26 |
| 4 | 8,771 |  | 820 | 26 |
| 6 | N.D. |  | 179 | 31 |
| 8 | N.D. | 54 | N.D. | 48 |
| 12 | — |  | N.D. | 73 |
| 15 | N.D. | 86 |  |  |

N.D. = Non-detectable

EXAMPLE 5

In the following series of experiments, 50 grams of water were added at different intervals to 50 grams of starting slurry, as follows:

A: Water added after 1 minute
B: Water added after 2 minutes
C: Water added after 4 minutes Results are reported in Table 5 below:

In another run, tabulated under D in Table 5, 100 grams of PVC slurry were subjected to microwave irradiation and 50 grams water added to the slurry respectively after 4 and 12 minutes exposure. The treated resin slurry dried to 79% solids content, contained no detectable vinyl chloride monomer.

EXAMPLE 6

A PVC slurry was air dried to 99% solids. Fifty grams of the dried resin was reconstituted with 100 grams of water and subjected to microwave radiation. Analyses of samples taken at indicated times during irradiation is reported in Table 6.

TABLE 6

| Time (min) | Residual VCM (ppm) | % solids |
|---|---|---|
| 0 | 360 | 99 |
| 2 | 61 | 57 |
| 4 | 43 | 58 |
| 12 | 32 | 75 |
| 20 | N.D. | 99 |

The rate and extent of monomer removal was found to be related to particle porosity. In the runs of Examples 1 to 6, the resin employed had an IPTU value of 28.8 before treatment. In the following run, the resin contained in the slurry had a slightly lower porosity, represented by an IPTU value of 26.8 before treatment and 30.8 after irradiation treatment.

Fifty grams of the suspension vinyl chloride homopolymer were subjected to microwave irradiation. Samples taken periodically from the oven during irradiation showed the following analysis in repeated runs on different batches of the same material.

TABLE 7

| Time (min) | Run A Residual VCM (ppm) | % solids | Run B Residual VCM (ppm) | % solids |
|---|---|---|---|---|
| 0 | 15,588 | 50 | 7,526 | 46 |
| 2 | 633 | 59 | 400 | 63 |
| 4 | 32 | 69 | 130 | 78 |
| 6 | 116 | 87 |  |  |
| 8 | 70 | 87 | 79 | 96 |
| 12 |  |  | 49 | 98 |
| 15 | 90 | 96 |  |  |

The material tested in the following experimental runs was a low porosity suspension copolymer of vinyl chloride-vinyl acetate; IPTU value was 8.4 before treatment and 8.0 after treatment. Three separate irradiation runs were made in a microwave oven on fresh samples of the slurry with the results reported in Table 8.

TABLE 5

| Time | A Resid VCM (ppm) | % solids | B Resid VCM (ppm) | % solids | C Resid VCM (ppm) | % solids | D Resid VCM (ppm) | % solids |
|---|---|---|---|---|---|---|---|---|
| 0 | 40914 | 47 | 36763 | 50 | 8807 | 47 | 11982 | 50 |
| 1 | 1249 | 53 | — | — |  |  |  |  |
| 2 | 1765 | 13 | 7192 | 59 | 199 | 61 | 3163 | 64 |
| 4 | 300 | 40 | 3334 | 35 | 76 | 69 |  | 77 |
| 6 | — | — | — | — | — | — | 2143 | 51 |
| 8 | 377 | 48 | 688 | 54 | N.D. | 46 | 624 | 66 |
| 12 | 51 | 80 | N.D. | 76 |  |  | 63 | 58 |
| 15 |  |  |  |  |  |  | 31 | 54 |
| 20 |  |  |  |  |  |  | N.D. | 79 |

TABLE 8

| Time (min) | A Residual VCM (ppm) | % solids | B Residual VCM (ppm) | % solids | C Residual VCM (ppm) | % solids |
|---|---|---|---|---|---|---|
| 0 | 12313 | 51 | 48875 | 51 | 36268 | 51 |
| 2 | 13020 | 69 | 18575 | 69 | 11863 | 69 |
| 4 | 13150 | 76 | 13676 | 76 | 6601 | 76 |
| 6 | 11015 | 90 | 10382 | 90 | | |
| 8 | 10595 | 92 | 6918 | 92 | 1634 | 92 |
| 12 | *5050 | 98 | *1777 | 92 | *144 | 98 |

*decomposition noted

Resin properties were not detrimentally affected by the irradiation except when the material is brought to substantial dryness and accompanying decomposition. The presence of water is necessary for effective removal of vinyl chloride monomer from polyvinyl chloride without accompanying resin decomposition. By addition of water, the vinyl chloride monomer in the resin can be decreased to non-detectable quantity.

While in the foregoing experiments, the microwave ovens employed had a frequency rating of 2450 megacycles/second, the practice of the invention is not limited thereto. Some advantages may be obtained using an energy source more closely tuned to the vibrational frequency of the vinyl chloride molecule. The frequencies presently permitted by the FCC for microwave heating are:

915±25 mc/sec
2450±50 mc/sec
5800±75 mc/sec
22,125±125 mc/sec

If desired, an inert gas may be admitted to the resin slurry during irradiation as a mixing aid to enhance monomer removal.

What is claimed is:

1. The method of removing residual vinyl chloride monomer from polyvinyl chloride homopolymers and copolymers of vinyl chloride and vinyl acetate which consisting essentially of subjecting such polymer in the presence of at least 10% water by weight of the mixture to microwave irradiation at a frequency of about 2450 mc/sec. for at least 6 minutes and recovering said polymer in which at least 90% by weight of said residual vinyl chloride monomer has been removed.

2. The method of claim 1 wherein the water content of the water-polymer mixture subjected to irradiation constitutes at least 20% by weight of the mixture.

* * * * *